June 1, 1937.　　　L. B. TERHUNE　　　2,081,962
CUTTING MACHINE OR THE LIKE AND DRIVE THEREFOR
Filed Dec. 23, 1933　　　8 Sheets-Sheet 1
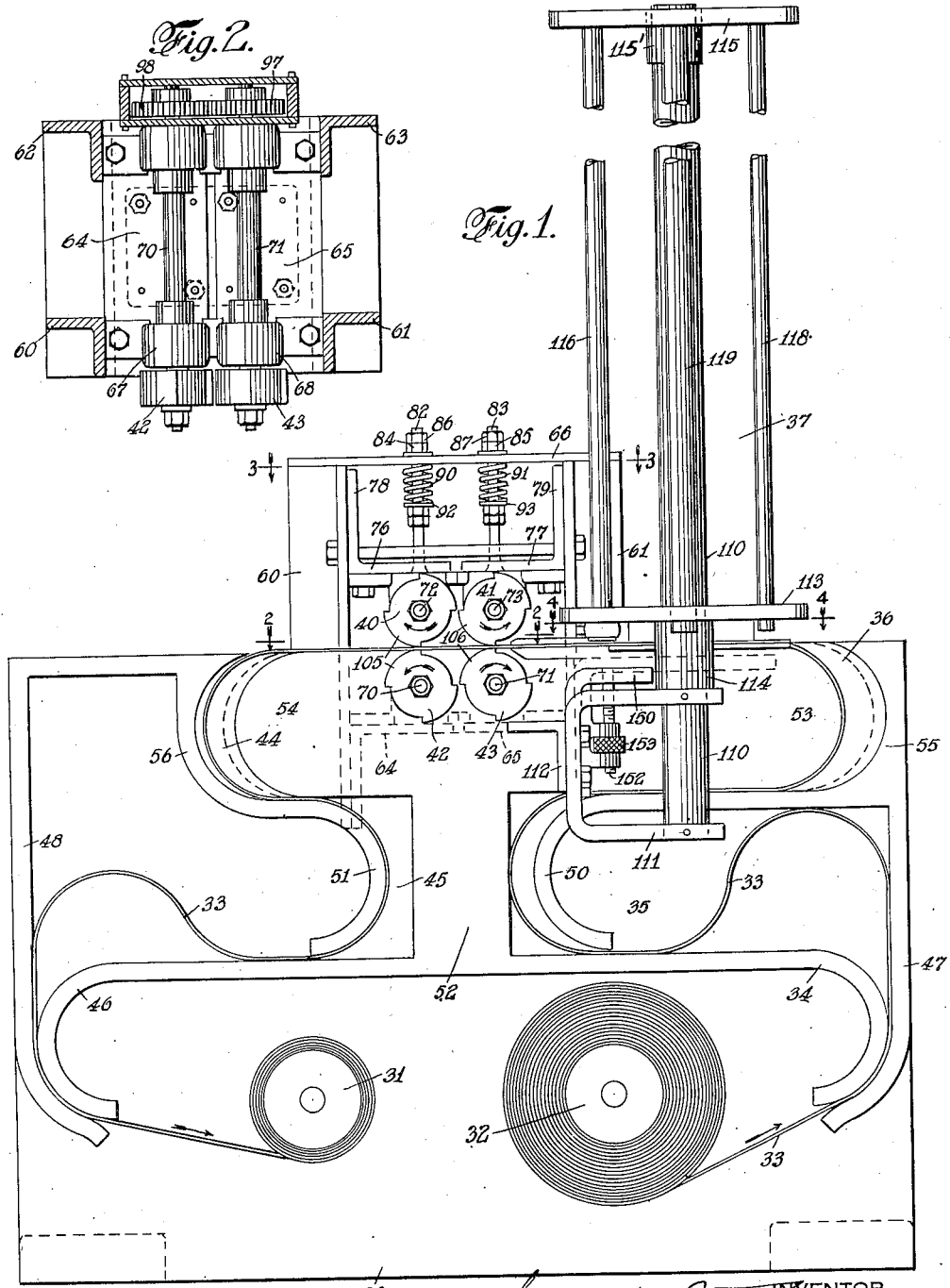

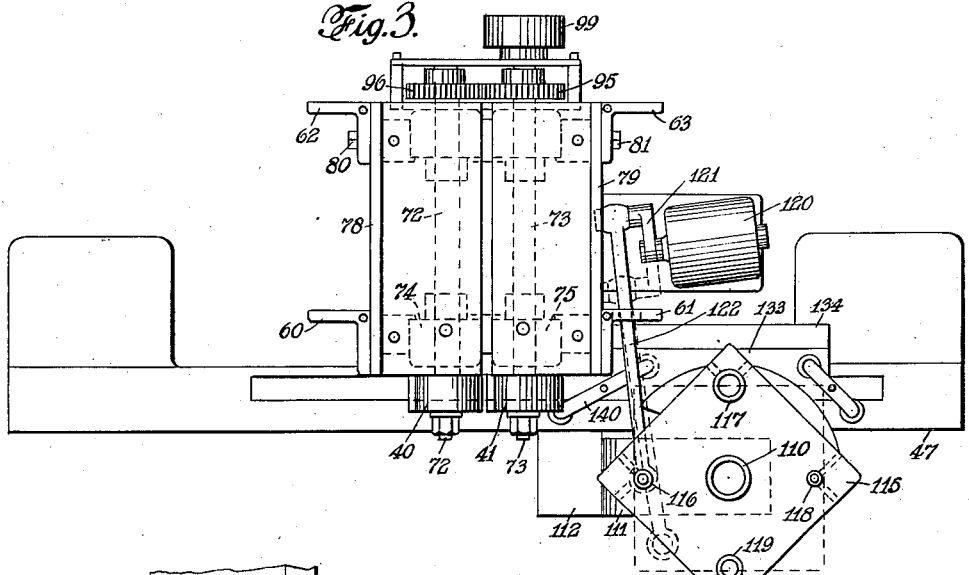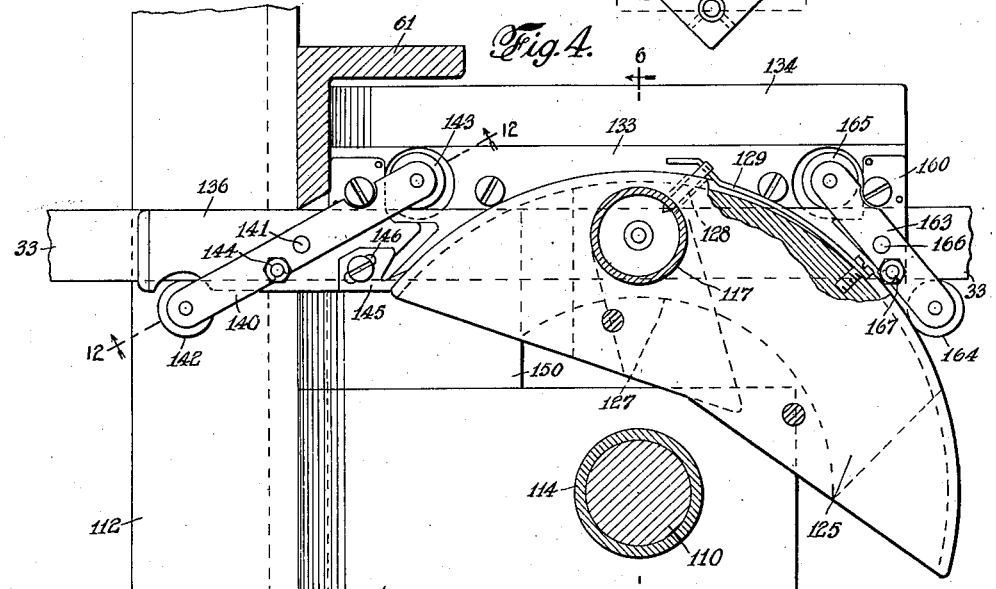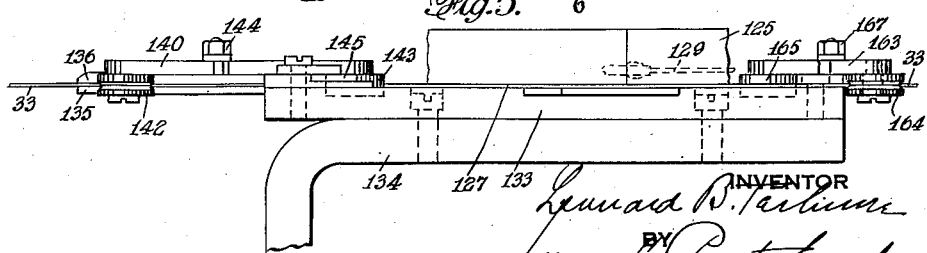

June 1, 1937.  L. B. TERHUNE  2,081,962
CUTTING MACHINE OR THE LIKE AND DRIVE THEREFOR
Filed Dec. 23, 1933  8 Sheets-Sheet 3
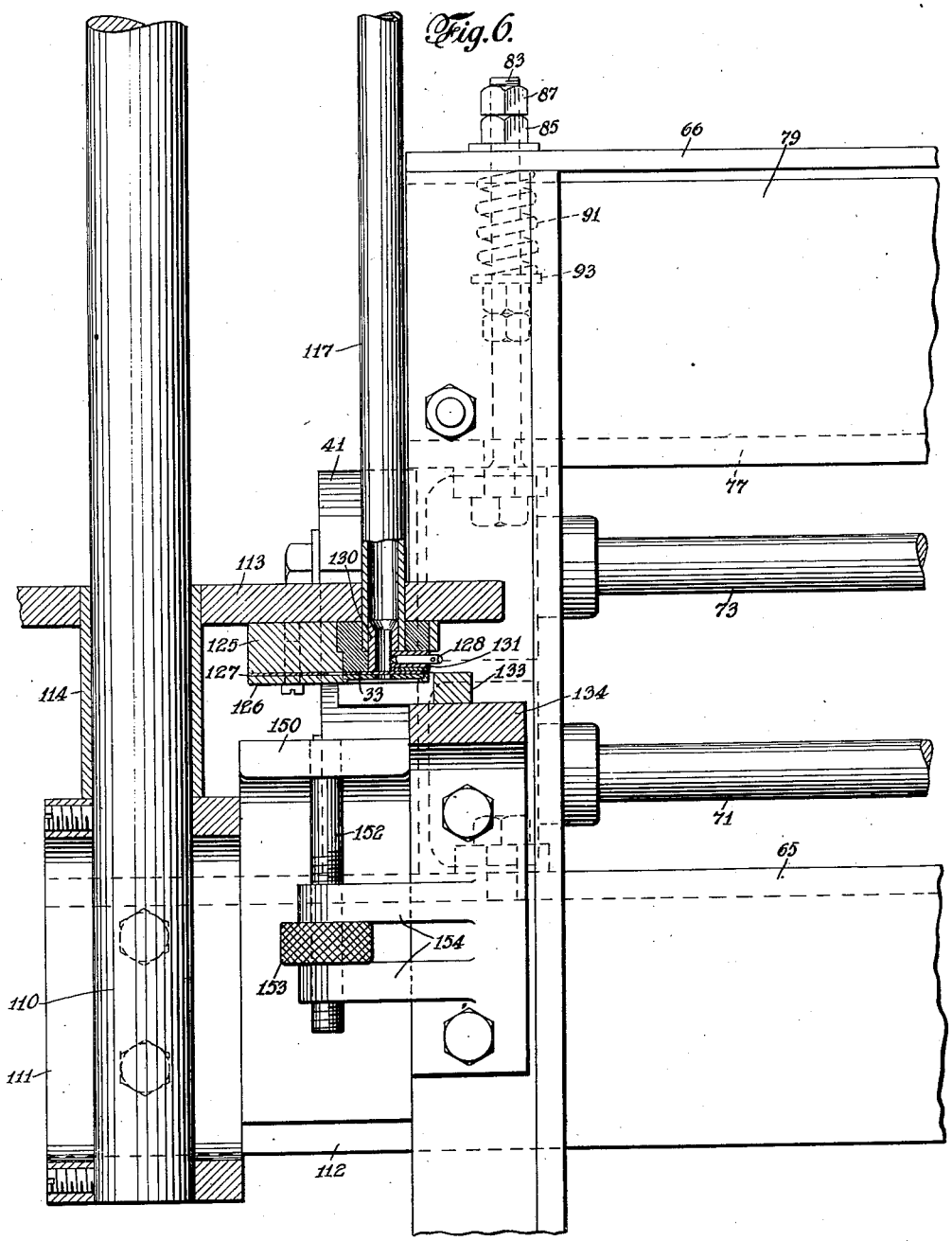

June 1, 1937.  L. B. TERHUNE  2,081,962
CUTTING MACHINE OR THE LIKE AND DRIVE THEREFOR
Filed Dec. 23, 1933  8 Sheets-Sheet 4
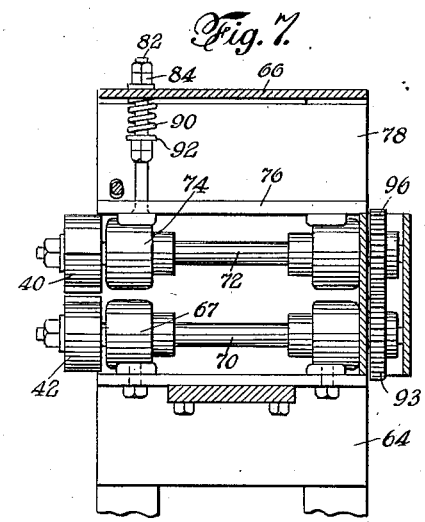
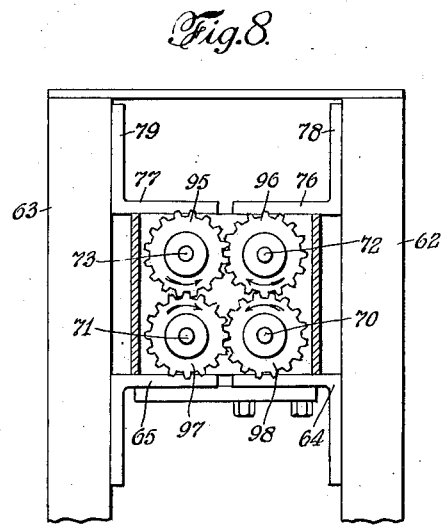
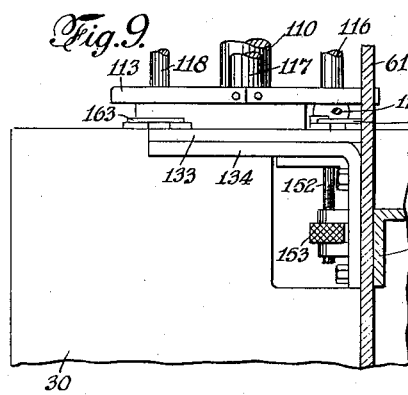
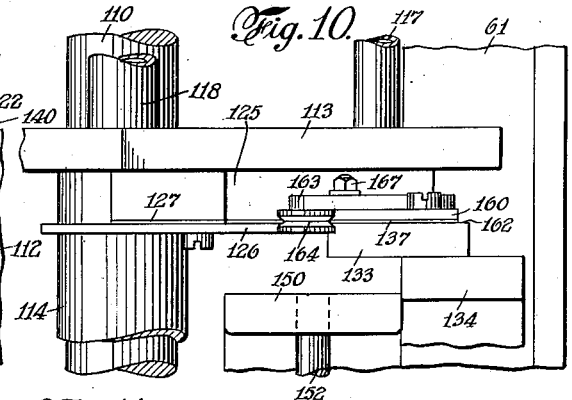
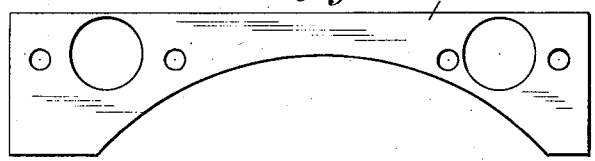
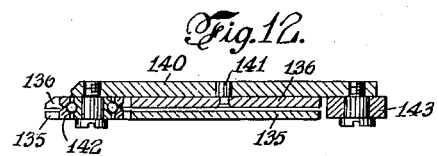

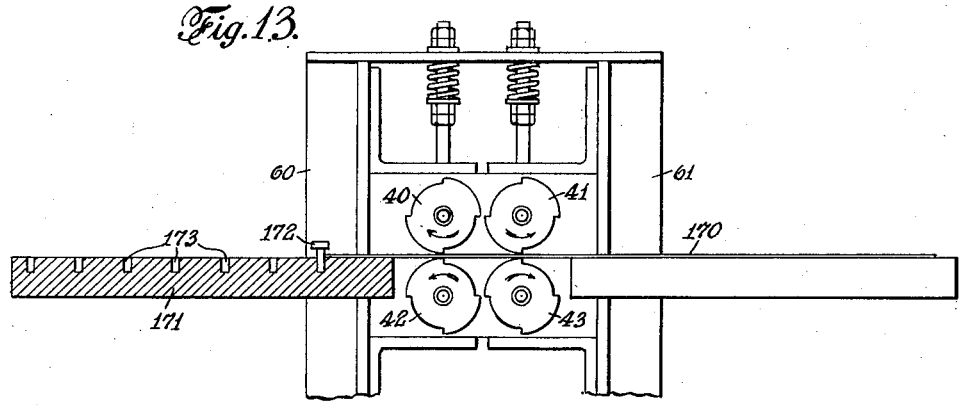
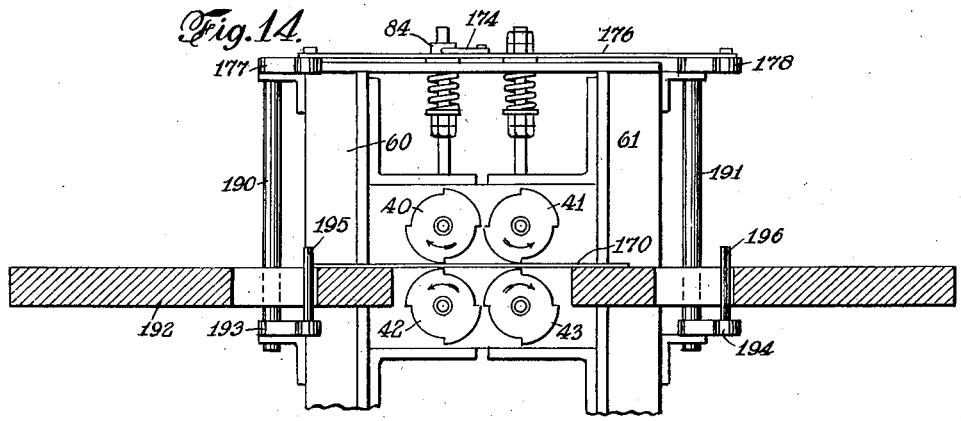
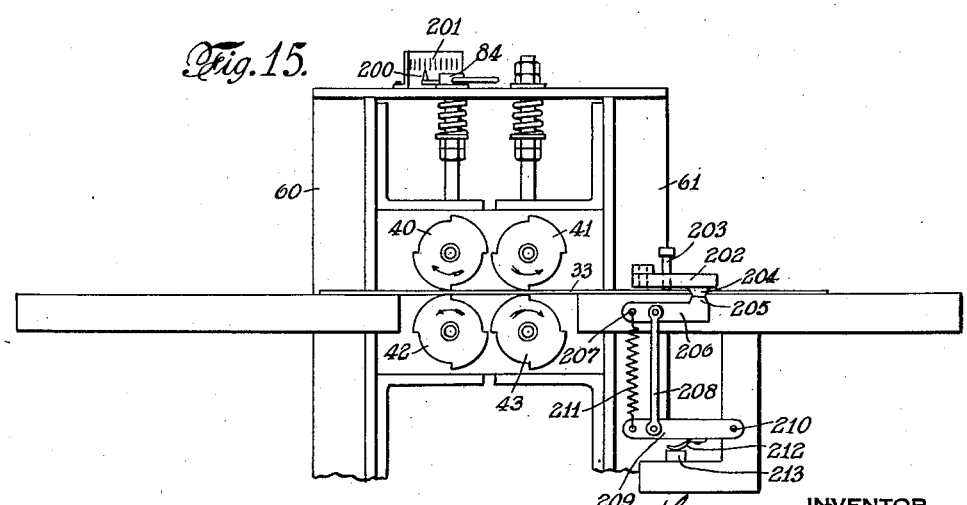

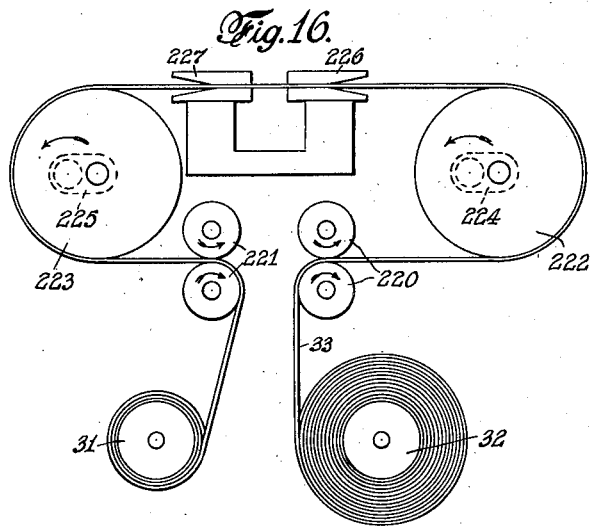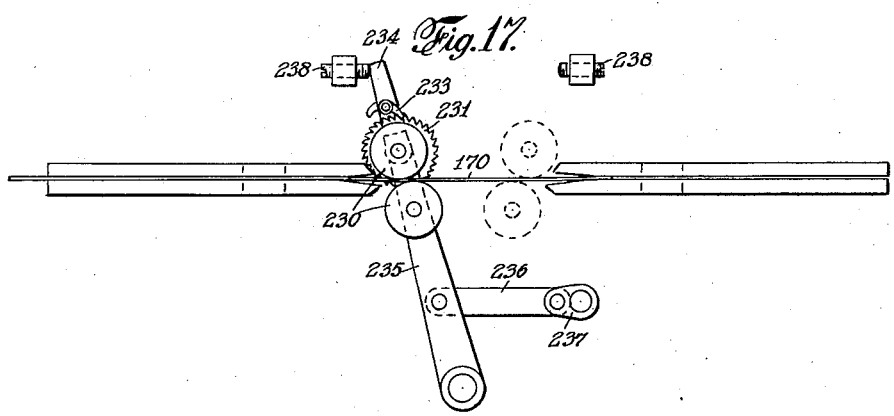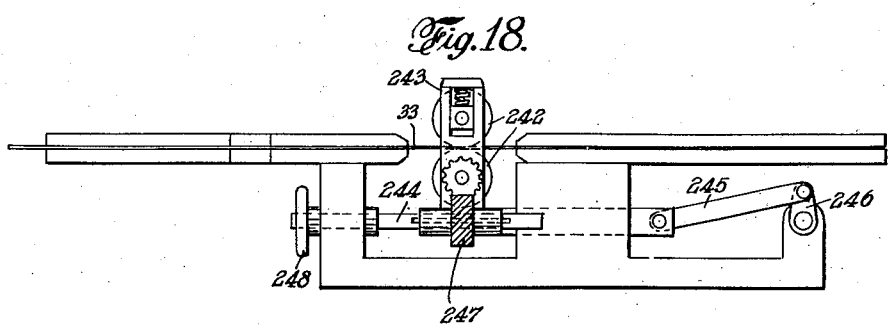

June 1, 1937.  L. B. TERHUNE  2,081,962
CUTTING MACHINE OR THE LIKE AND DRIVE THEREFOR
Filed Dec. 23, 1933  8 Sheets-Sheet 7
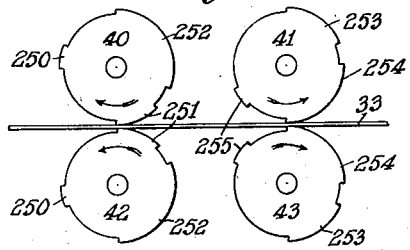
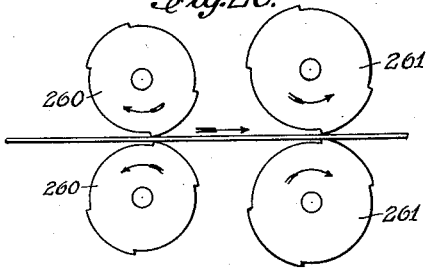
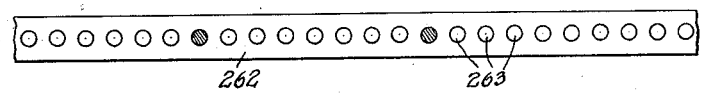
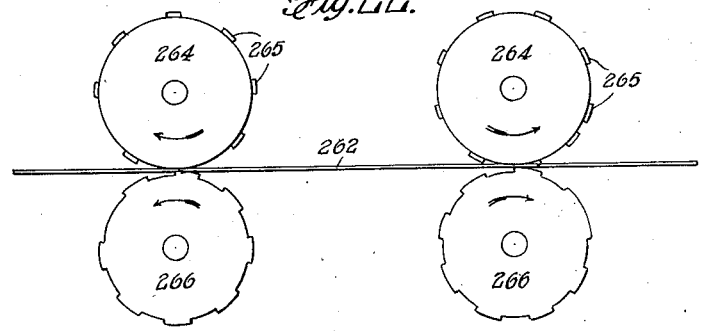
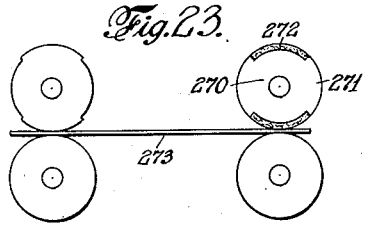
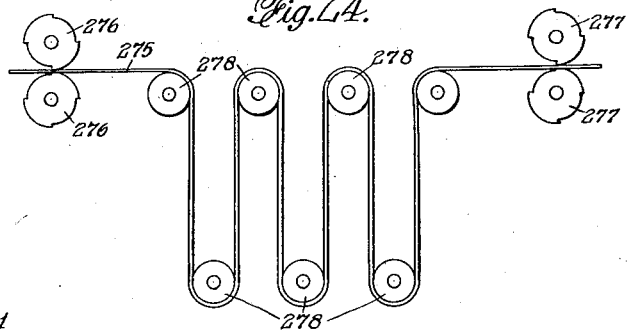
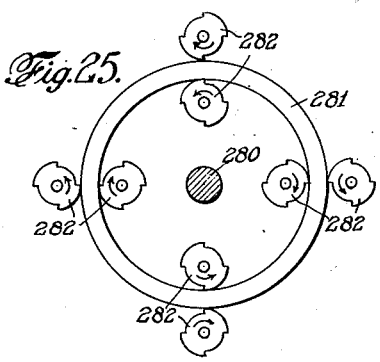
INVENTOR
Leonard B. Terhune
BY
Wm. S. Pritchard
ATTORNEY June 1, 1937.  L. B. TERHUNE  2,081,962
CUTTING MACHINE OR THE LIKE AND DRIVE THEREFOR
Filed Dec. 23, 1933  8 Sheets-Sheet 8

Leonard B. Terhune INVENTOR
Wm. S. Pritchard BY
ATTORNEY

Patented June 1, 1937

2,081,962

UNITED STATES PATENT OFFICE 2,081,962

CUTTING MACHINE OR THE LIKE AND DRIVE THEREFOR

Leonard B. Terhune, West Milford, N. J.

Application December 23, 1933, Serial No. 703,725

62 Claims. (Cl. 164—35)

This invention relates to a mechanism for producing combined reciprocating and progressive movement and is particularly applicable to a mechanical drive for a band saw, washing machine or the like.

In a specific embodiment, the invention may be applied to a band saw for cutting plastic material, such as molded packing.

An object of the invention is to provide an inexpensive, simple and dependable mechanism to produce combined reciprocating and progressive movement.

Another object is to provide mechanism to reciprocate the cutting or sawing member of a cutting or sawing machine at a high speed while slowly feeding the member through the machine.

Another object is to provide a mechanism of the above type which is capable of easy adjustment for varying the rate of feed.

Another object is to provide a mechanism for driving the blade first in one direction and then in the other while maintaining the blade under tension so that a long or endless blade of thin, inexpensive material may be used.

A still further object is to provide a mechanism whereby new portions of the cutting edge may be continuously or intermittently brought into use without interrupting the operation of the machine.

O further object is to provide a machine in which the cutting member may be reciprocated at very high speed and at the same time may be fed through the machine at low speed.

A still further object is to provide a drive of the above type which is generally applicable to machines requiring for efficient operation an irregular or uneven movement, such as washing machines, sanding machines, shaking machines, mixing machines, or the like.

A still further object is to provide mechanism for feeding material to a cutting machine in such a way that frayed edges are largely eliminated.

Another object is to provide a cutting machine which is adapted for gang cutting or for the cutting of irregular shapes.

Another object is to provide a machine for cutting sections from an elongated member, such as a tube of molded packing.

The invention also consists in the various new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description, taken in connection with the accompanying drawings forming a part thereof, in which:

Figure 1 is a front elevation of a cutting machine embodying the present invention;

Figure 2 is a section taken on the line 2—2 of Figure 1 showing the drive for the lower drive rolls;

Figure 3 is a section taken on the line 3—3 of Figure 1 showing the drive for the top drive rolls and for the turret;

Figure 4 is a section taken on the line 4—4 of Figure 1 showing the cutter guide;

Figure 5 is a front elevation of the mechanism shown in Figure 4;

Figure 6 is an enlarged section taken on the line 6—6 of Figure 4 showing the support for the turret and cutter guide;

Figure 7 is a vertical section taken on the line 7—7 of Figure 1 showing the upper and lower drive rolls;

Figure 8 is a section taken on the line 8—8 of Figure 2;

Figure 9 is a rear elevation of the cutter guide and lower turret plate;

Figure 10 is an enlarged detail view of the cutter guide and table;

Figure 11 is a detail view of the stationary guide plate;

Figure 12 is a section taken on the line 12—12 of Figure 4;

Figure 13 is a partial side elevation of a modified form of the invention showing an adjustable stop for the cutting blade;

Figure 14 is a partial side elevation of a further modified form of the invention showing an automatic reverse mechanism for the cutting blade;

Figure 15 is a partial side elevation of a further modification showing an automatic stop for the machine;

Figures 16, 17 and 18 are diagrammatic views of modified types of drive for the cutting blade;

Figures 19 and 20 are detailed views of certain specific types of drive rolls;

Figure 21 is a plan view of a perforated cutting blade;

Figure 22 is a partial side elevation showing the drive of the blade of Figure 21;

Figure 23 is a diagrammatic illustration of a further modified type of drive;

Figure 24 is a diagrammatic view showing the invention as applied to a gang saw;

Figure 25 is a diagrammatic view illustrating the application of the invention to a rotary member, such as a washing machine.

Like reference characters denote like parts in the several figures of the drawings.

Figure 26:
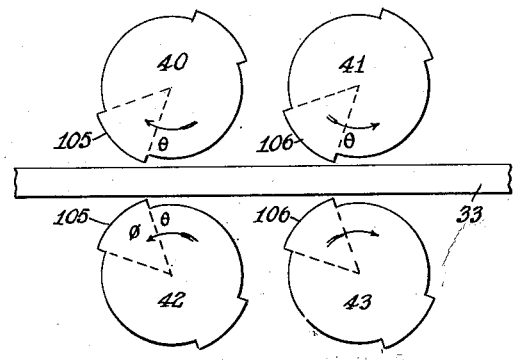
Figures 26 to 30 are diagrams illustrating the operating characteristics of the device.

In the following description and in the claims, various details will be identified by specific names for convenience, but they are intended to be as generic in their application as the art will permit.

Referring to the drawings more in detail, the invention is shown in Figures 1 to 12 as embodied in a cutting or sawing machine comprising a supporting plate 30 on which reels 31 and 32 are mounted in any convenient manner, and carry, for example, a band-cutting member, such as a blade 33 (Figure 1). The cutting blade 33 is fed, for example, from the reel 32 around a guide flange 34 through a feed chamber 35 and a crescent-shaped chamber 36, past a turret 37 which is adapted to feed the material to be cut, thence between drive rolls 40, 41, 42 and 43, through a crescent-shaped chamber 44, a feed chamber 45, around a guide flange 46 and on to the reel 31. The direction of feed, however, may be from reel 31 to reel 32 and it is to be understood that the device is fully reversible.

The supporting plate 30 may be provided with side flanges 47 and 48 which may cooperate respectively with the guide flanges 34 and 46 to direct the blade 33 to or from the respective reels 31 and 32. The chambers 35 and 45 may be formed respectively by circular flanges 50 and 51 which are formed on or secured to the supporting plate 30 and cooperate with a central boss 52 on said plate. The crescent-shaped chambers 36 and 44 may be formed respectively between bosses 53 and 54 formed on said supporting plate 30 and flanges 55 and 56 which are also formed on said plate and cooperate with said bosses 53 and 54.

The purpose of the crescent-shaped chambers 36 and 44 is to permit the portion of the cutting blade 33 extending past the turret 37 and the drive rolls to reciprocate, without imparting a similar movement to the remainder of the cutting blade and without causing an uneven movement of the reels. For this purpose, a narrow opening is formed at the entrance of the chambers 36 and 44 between the bosses 53 and 54 and the flanges 55 and 56. The blade passing into or out of the chambers 36 and 44 through the above-mentioned opening operates as an effective lever and is permitted to reciprocate in said chambers while feeding at a steady and uniform rate through the feed chambers 35 and 45 and around the guide flanges 34 and 46. It is to be understood that a certain amount of slack may be provided in the feed chambers or in supply chambers formed between the flanges 34 and 35 and the flanges 46 and 51 respectively, which further eliminates any unevenness in feed from the reels themselves.

It is to be understood that the above-mentioned chambers may be formed in or associated with the supporting plate 30 in any convenient manner and may, if desired, be completely enclosed as by a separate cover member (not shown).

The support and drive for the rolls 40 to 43 may comprise, for example, front vertical supports 60 and 61, such as angle irons (Figure 2), which may be secured to the supporting plate 30 in any convenient manner, and rear vertical supports 62 and 63 which are secured to the front supports 60 and 61 by means of lower horizontal supports 64 and 65 and by a top plate 66 (Figure 1). The lower supports 64 and 65 carry bearings 67 and 68, respectively, (Figure 2), in which are mounted shafts 70 and 71 carrying the lower feed rolls 42 and 43, respectively.

The upper drive rolls 40 and 41 are mounted on shafts 72 and 73 which are journaled in bearings 74 and 75 (Figure 3) secured to upper supporting members 76 and 77 which extend between the front and rear vertical supports 60 to 63. The supporting members 76 and 77 may comprise, for example, angle irons having upright flanges 78 and 79 which are pivotally secured at their rear ends to the vertical supports 62 and 63, as by bolts 80 and 81, respectively. At their forward ends, the supports 76 and 77 are secured to rods 82 and 83 (Figures 1 and 6) which extend upwardly through the cover plate 66 and are provided with adjusting nuts 84 and 85 and lock nuts 86 and 87 by which vertical adjustment of the rods and of the forward ends of the supports 76 and 77 may be made. The supports 76 and 77 are resiliently urged downwardly by springs 90 and 91, which are held under compression between the cover plate 66, and washers 92 and 93 mounted respectively on the rods 82 and 83 in any convenient manner.

Shafts 70, 71, 72 and 73 extend beyond the rear supports 62 and 63 and carry intermeshing gears 95 to 98 inclusive (Figure 8). One of the shafts, for example, shaft 73, may extend beyond its gear and carry a belt pulley 99 (Figure 3) by which the driving power is received.

It will be noted that the righthand pair of drive rolls 41 and 43, as shown in Figure 1, rotate in a direction to drive the cutting blade 33 to the right, whereas the left-hand pair of drive rolls 40 and 42 rotate in a direction to drive the cutting blade 33 to the left. Furthermore, it is to be noted that the rolls 40 and 42 are provided with cooperating driving segments 105 which are adapted to intermittently engage the cutting blade for driving the same, and that the rolls 42 and 43 are provided with segments 106 which engage the cutting blade 33 alternately with the segments 105 and tend to intermittently drive the cutting blade to the right.

The segments 105 and 106 are so designed that when one of these sets of segments is driving the cutting blade, the other set of segments is released. Hence, the direction of movement of the cutting blade and the extent of movement is determined by the particular set of segments which engage the blade at a given instant. The springs 90 and 91 are adapted to hold the upper feed rolls 40 and 41 in driving relationship to the cutting blade 33, and the adjusting nuts 84 and 85 limit the downward movement of the rolls 40 and 41 in the intervals while the segments 105 and 106 respectively are disengaged from the cutting member.

From the above it is evident that the cutting member is driven first in one direction and then in the other by the alternating engagement of segments 105 and 106, the length of stroke depending upon the length of the arcs comprised in these segments. The length of the stroke, however, may be adjusted by changing the vertical adjustment and separation of the centers of the rolls 40 to 43 by means of the above-mentioned adjusting nuts 84 and 85.

The adjustment of the feed in this manner is illustrated in Figures 26 to 30. In these figures, segments 105 and 106 are assumed to extend over the angle Φ. In Figure 26, the segments 105 have advanced by the angle θ past the line joining the centers of the rolls 40 and 42. The segments 106 are likewise retarded by the angle θ from the line joining the centers of the rolls 41 and 43. In this position, the blade 33 is released from both of the segments and may be removed or replaced. It is to be noted that the blade remains stationary while the rolls 40 and 42 are rotating through angle θ and also while the rolls 41 and 43 are advancing through the angle θ.

Figure 27:
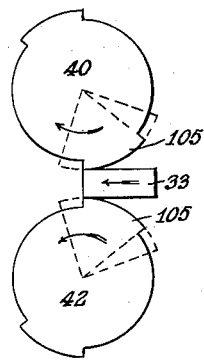
Figure 29:
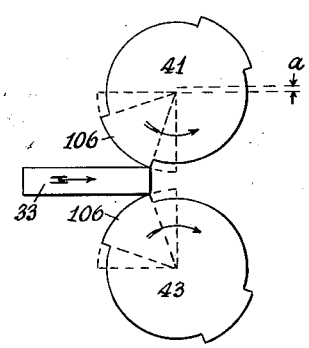
Figure 28:
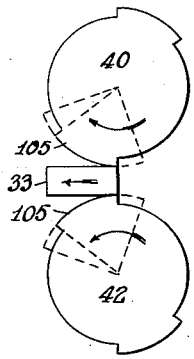
Figure 30:
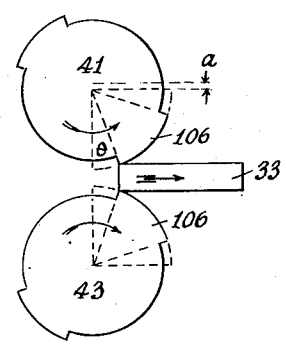

Figures 27 and 28 illustrate the amount of movement of the blade 33 in this condition of adjustment. In Figure 27, the segments 105 are shown as beginning to engage the blade 33, and in Figure 28, the segments 105 are shown as just breaking engagment with the blade 33. Between the positions of these two figures, the blade has moved a distance equal to the arc Φ. Thereafter, no further movement of the blade will take place until the diametrically opposite segments 105 have reached a position to engage the blade.

Assuming now that the centers of the rolls 41 and 43 have been brought closer together by the amount $a$ (Figures 29 and 30) such that the segments 106 begin to engage the blade 33 while the segments are still spaced from the line joining the centers of said rolls by the angle θ, it will be noted that the segments are in driving relationship to the blade 33 during the entire period while the segments are rotating to the position shown in Figure 28, in which the segments have advanced beyond the line joining the centers by the angle θ. The entire movement of the blade under these conditions corresponds to the arc Φ+2θ. The movement is accordingly greater than that depicted in Figures 26 to 28 by the arc 2θ.

As an example of the minute adjustment that may be obtained in this manner, it may be assumed that the rolls are rotating at a speed of 500 R. P. M., and it is desired to advance the blade at a rate of one inch per minute. Each roll has two driving segments and each segment has associated therewith two angles θ. There are accordingly 2000 angles θ per minute. Dividing 1 by 2000, it is noted that each of the arcs θ advance the blade .0005 inch. Obviously, the amount of displacement $a$ of the centers of the rolls to obtain this small change in feed is extremely minute.

For feeding material to the cutting blade, a turret 37 is provided (Figure 1) which may be supported, for example, on a shaft 110 held in a U-shaped member 111 which may be carried by an extension 112 of the lower support 68 extending, for example, to the front of the supporting plate 30. Upon the rod 110 there is journaled a lower turret plate 113 having a bearing member 114 and an upper turret plate 115 having a bearing member 115'. Between the plates 113 and 115 are secured a plurality of feed tubes 116 to 119 (Figure 3) through which the material to be cut is fed into cutting position. The feed tubes 116 to 119 are preferably of different diameters so as to accommodate materials having different dimensions. The turret may be oscillated from a position shown in dotted lines in Figure 3 in which the tube 117 is out of engagement with the cutting blade 33, into the position shown in full lines in Figure 3 in which the cutting member has completely passed through the material within the tube 117. For this purpose, a motor 120 may be provided having a crank 121 connected by an arm 122 to the tube 116. The motor 120 may be operated from any suitable power source (not shown). In order to bring the various tubes 116 to 119 into cutting position, the arm 122 may be disconnected, for example, from the tube 116, the turret may be rotated, for example, through a quarter revolution, and the link 122 may be connected to the tube 117, in which case the tube 118 will be in cutting position.

It will be noted that the material being cut is fed to the blade over a path comprising the arc of a circle which becomes substantially parallel to the blade when the cutting operation is finished. The material is accordingly first fed to the blade at a rapid rate and, as the blade nears the end of its cutting operation, the rate is diminished and the material being cut is moved substantially parallel to the blade so that there is less tendency for the blade to force its way through the material and produce ragged edges at the point at which it emerges from the material.

For supporting and guiding the cutting blade 33 during the cutting operation, a pair of guide plates 125 and 126 (Figures 4 and 6), separated by a spacing member 127 of sufficient thickness to provide clearance for the blade between said plates, are secured to the bottom of the turret plate 113. These plates are of semi-circular form and are adapted to extend above and below the cutting blade while the turret is rotated to feed the material toward the cutting position. When the turret is adjusted to bring a different tube into cutting position, it is to be understood that these guide plates are removed and re-located at a position to cooperate with the desired feed tube. A pin 128 may be secured in the plate 125 in a position to extend through the tube 117, which is assumed to be in cutting position, and engages the material in the tube 117 to support the same and prevent it from vibrating during the cutting operation. The pin 128 may be resiliently held in contact with said material by means of a spring wire 129 which is secured to the plate 125. For this purpose, the spring wire may pass through an aperture in the end of the pin 128, and the pin may be removed for replacement purposes, for example, when the pin is to engage a material having different diameters, by merely removing the pin from the plate 125 against the tension of the wire 129 and then slipping the pin from said wire. The tube 117 may contain a bushing 130 which is adapted to guide the material being cut. A bushing 131 in which the pin 128 is slidable extends into the bushing 130 and holds the same when the pin 128 is removed.

The bushing 130 may be replaceable for different sizes of material. It may have only a slight clearance with the blade 33 and may cooperate with a similar bushing on the lower plate 126 to support the blade 33 at the cutting point and to permit the plates 125 and 126 to have a greater clearance with the blade.

A stationary guide and support 133 (Figures 4, 5 and 11) may be mounted upon a bracket 134 which may be carried, for example, by the upright support 61. The guide and support 133 extends below the position of the blade 33 and carries at one end a pair of guide plates 135 and 136 which are separated, for example, by a spacing member 137 of sufficient thickness to provide clearance for the passage of the blade 33 between said plates. The plate 135 may also carry an arm 140 which may be pivoted thereto, as at 141, and may carry at one end a depending grooved roll 142 and at the other end a depending plain roll 143, which rolls are adapted to bear against the two edges of the blade 33 for holding the same in the desired position during operation. The arm 140 may be clamped in any desired position by a bolt 144 carried in the plate 135. The plate 135 may also carry a cam member 145 which may be adjustably secured thereto by means of a pin extending through an elongated slot 146, and is adapted to engage the end of the wire 129 when the turret is moved into retracted position after a cutting operation. The cam 145 is adapted to release the pin 128 from the material and to permit the material to feed through the tube 117 into its new cutting position.

To limit the feeding movement of the material, a table 150 is provided which may comprise, for example, an angle member adjustably secured between the bracket 134 and the member 111 by a rod 152 having a knurled nut 153 threaded thereon, which nut is located between a pair of arms 154 formed on the bracket 134. Vertical adjustment of the table 150 is thus obtained by rotating the nut 153 and thereby causing the rod 152 to feed in a vertical direction.

In the retracted position of the turret the feed tube 117, containing the material to be cut, is directly above the table 150, and when the pin 128 is released, the material feeds through the tube until it rests upon said table. Thereafter, when the turret is brought in cutting position, an additional amount of material is cut, depending upon the displacement of the table 150 with respect to the blade 33.

Obviously, the material should move beyond the table 150 at the end of the cutting operation so as to permit the cut portion to drop to a suitable receiver (not shown).

The support and guide 133 also carries a guide plate 160 (Figures 4 and 5) separated by spacing member 162 and adapted to guide the cutting blade as it approaches the cutting position. The plate 160 may also carry an arm 163 having a depending grooved roll 164 at one end and a depending plain roll 165 at the other end and pivoted to said plate, as at 166. The arm 163 may be clamped in position by a bolt 167 whereby the two rolls 164 and 165 engage the edges of the band for maintaining the same in cutting position. It is to be noted that the rolls 142 and 164 which engage the side of the cutting band adjacent the cutting edge are grooved. This prevents injury to the cutting edge and, in addition, assists in guiding the edge during cutting operation. The rolls 142 and 164 may be mounted on ball bearings, if desired, to improve the operation thereof. The plate 133 may be depressed to receive the rolls 143 and 165 and to provide clearance therefor.

In the operation of the machine thus far described, it is to be noted that the cutting blade 33 is fed from, for example, the reel 32 to the reel 31 while at the same time a rapid reciprocating motion is imparted to the portion of the blade extending between the crescent-shaped chambers 36 and 44. The blade is accordingly reciprocated, whereby the most efficient cutting effect is obtained, and the wear on the cutting element is reduced to a minimum, and, at the same time, the blade is progressively fed through the machine so as to continuously bring new cutting teeth into cutting position. Inasmuch as the weight of the driving mechanism is reduced to a minimum, it is evident that the machine will be particularly free from vibration and that no excessive centrifugal forces are involved. Furthermore, the adjustment of the feed is extremely simple and accurate. It is to be noted that the adjustment of the supports 76 and 77 is so minute that the operation of the gear wheels 95 to 98 is not affected thereby.

The particular turret described above is adapted to feed tubular semi-plastic materials, such as molded packing, which may be cut in sections in the manner described without leaving frayed edges at the portion of the packing from which the cutting edge emerges. Furthermore, the feed of the packing material between cutting strokes is entirely automatic and the thickness of the sections is determined by the elevation of the table 150.

Although a particular embodiment of the invention has been described, it is obvious that the drive may be applied to various uses and may be modified in various respects. Examples of certain modifications and adaptations of the drive are given below, although it is to be understood that the invention is not to be limited thereto.

In Figure 13, for example, the drive is shown as applied to a comparatively short rigid blade 170. It is assumed that the drive rolls 40 to 43 and associated mechanism are similar to those above described and that the rolls are so adjusted that the blade is progressively fed toward the left. In this form of the invention, a plate 171 is provided, carrying a stop member 172 which may be inserted in any of a plurality of sockets 173. The blade 170 is fed to the left until the end of said blade engages the stop member 172. The blade is then caused to reciprocate in the same position until the stop member 172 is removed from its socket and is applied to the next successive socket to the left. The blade 170 is then fed until the end of the blade engages the stop member in its new position, and thereafter continues to oscillate until the stop member is again moved. In this type of device, the blade is used in one position until the cutting edge becomes dull. It is then fed to a second position in which a new cutting edge is brought into operation by merely moving the stop member and without in any manner interrupting the operation of the machine.

In Figure 14 is shown a form of the invention in which a rigid blade 170 of definite length may be reciprocated and at the same time fed in one direction until the entire length of the blade has been successively brought into cutting position, and the direction of feed is then automatically reversed. The movement accordingly comprises a combination of a rapid reciprocation and a slow feed first in one direction and then in the other. For this purpose, the adjusting nut 84 may be secured to a lever arm 174 connecting with a link 176 which is pivoted at its ends to arms 177 and 178 carried upon rods 190 and 191 which are journaled in bracket supports attached to uprights 60, 61 in the frame of the machine and carry at their lower ends arms 193 and 194 respectively, upon which are mounted pins 195 and 196 in a position to engage the ends of the cutting blade when it has reached the limit of its travel. In this type of machine, assuming that the cutting blade 170 is fed to the left until the end thereof engages the pin 195, further movement of the blade causes pivotal movement of the arm 193 and, through the linkage above described, produces a similar movement of the lever 174 which turns the adjusting nut 84 in a clockwise direction, thereby raising the rod 82 and changing the adjustment of the rolls in such manner that the feed is reversed. A similar action occurs when the blade 170 is fed to the right a sufficient distance to permit the end thereof to engage the pin 196, thereby causing a reverse movement of the lever 174 and a counterclockwise movement of the adjusting nut 84 which lowers the roll 40 and again reverses the feed.

In the modification shown in Figure 15, the adjusting nut 84 is provided with a pointer 200 which cooperates with a scale 201 for showing the condition of adjustment of the rolls. The scale 201 may be graduated to indicate the rate of feed or in any other convenient unit. It is to be understood that this arrangement is applicable to the various embodiments of the invention and is not limited to the embodiment illustrated in Figure 15.

Figure 15 also illustrates an automatic stop for interrupting the operation of the machine when the blade has reached the end of its travel. This stop mechanism comprises a lever 202 pivoted for horizontal movement, for example, to the vertical support 61. The lever 202 carries a pin 203 which normally rests upon the blade 33 and also carries a cam member 204 which is adapted to engage a cam 205 formed on a lever 206 which is pivoted to a portion of the frame of the machine, as at 207. The lever 206 is connected by means of a link 208 to a third lever 209 which is also pivoted, as at 210, to the frame of the machine. A spring 211, which may be anchored to the pivot 207, is secured to the lever 209 and tends normally to hold said lever in an elevated position. The lever 209 carries a brush 212 which makes contact with the stationary contact 213 when the lever is in its lower position and is adapted to break said contact when the lever is elevated. The brush 212 and contact 213 are adapted to be connected in circuit with the driving motor of the machine (not shown), and are adapted to interrupt the operation of said motor when said contact is broken. The adjustment of the various levers is such that in normal operation the lever 202 depresses the levers 206 and 209 and maintains the contact 213 closed. After the blade 33 has been fed to the left a sufficient distance so that the end of the blade becomes disengaged from the pin 203, the lever 202 will drop a slight amount whereby the pin 203 is brought into alignment with the blade. Thereupon, the reciprocating motion of the blade causes the end of the blade to engage the pin 203 and to swing the lever 202 out of engagement with the lever 206. The lever 206 is then free to be elevated by means of the spring 211, thereby breaking the contact 213 and stopping the driving motor. It is obvious that the contact 213 may be connected to a signal device, if desired, to call attention to the fact that the machine has been stopped.

In the form of the invention illustrated in Figure 16, the blade 33 is continuously fed by drive rolls 220 and 221 from the reel 32 to the reel 31. The blade passes around wheels 222 and 223 which are mounted on eccentric arms 224 and 225 which in turn may be driven by any suitable means so as to cause an eccentric movement of the wheels 222 and 223 and to thereby impart a reciprocating movement to the blade 33, which is superimposed upon the progressive movement of the blade caused by the feed rolls 220 and 221. The blade may be fed between guides 226 and 227 which guide and support the blade in cutting position in any convenient manner.

A further modified form of drive which may be applied, for example, to a long rigid blade is illustrated in Figure 17. In this form of the invention, the blade 170 is held between a pair of drive rolls 230, one of which carries a ratchet mechanism 231 engaging a pawl 233 which is held, for example, on a pivoted leyer 234. The drive rolls 230 are mounted upon an arm 235 which is connected by a link 236 to a crank 237 which may be driven by any suitable means. The lever 234 may be pivoted to the arm 235, preferably about the axis of the ratchet mechanism 231.

In this form of the invention, a reciprocating movement is imparted to the blade by the reciprocation of the arm 235 which is caused by the rotation of the crank 237. Each time the arm approaches the end of its stroke, the lever 234 engages a stop 238 which causes pivotal movement of the lever and of the pawl 233, thereby rotating the ratchet 231 and the drive rolls 230 for feeding the blade a limited amount. For reversing the feed, the pawl 233 may be reversed to operate when the lever 234 engages the opposite stop 238. It is to be understood that suitable means may be provided to return the lever 234 to the position shown and that the ratchet mechanism 231 may comprise a pair of wheels having oppositely-inclined teeth which are respectively engaged by the two ends of the pawl 233.

A form of the invention is illustrated in Figure 18, in which the blade 33 is continuously reciprocated but is fed by hand, as desired, to bring new cutting teeth into cutting position. In this form of the invention, the blade 33 is held between drive rolls 242 mounted upon a bracket 243 which is slidably mounted on a rod 244 and is connected by a link 245 to a crank 246 which may be driven in any convenient manner. One of the drive rolls 242 is provided with teeth engaging a gear wheel 247 which is keyed to the shaft 244 in any convenient way. The shaft 244 also carries a hand wheel 248 by which it may be rotated as desired.

In this form of the invention, the reciprocating movement is imparted to the blade 33 by reason of the reciprocation of the bracket 243 caused by rotation of the crank 246. The blade may be fed, however, by rotation of the hand wheel 248 which rotates the gear 247 and the corresponding feed roll 242 a proportionate amount. This operation takes place without interrupting the oscillatory movement of the blade since the gear 247 and the bracket 243 are free to slide axially upon the rod 244.

Figure 19 illustrates a modification of the invention by which irregular reciprocating movement of the blade 33 may be obtained. In this form of the invention, the drive rolls 40 to 43 carry driving segments of unequal lengths, the rolls 40 and 42 carrying, for example, three segments 250 to 252, and the rolls 41 and 43 carrying segments 253 to 255 which are mutually spaced in such manner that the driving segments carried by the rolls 40 and 42 engage the blade 33 alternately with the driving segments carried by the rolls 41 and 43. Since these driving segments are of unequal length, it is obvious that an irregular reciprocating movement will be imparted to the blade. It is also obvious that this movement may be controlled by varying the number and extent of the various driving segments.

Figure 20 illustrates an arrangement to feed the blade at a greater rate than in the forms heretofore described. In this form of the invention, rolls 260 are of smaller diameter than rolls 261. If the rolls are rotated synchronously it is obvious that rolls 261 engage the blade 33 over a longer arc than the rolls 260 and that the feed will be to the right, as illustrated in Figure 20, an amount dependent upon the difference in lengths of the two sets of arcs.

Figures 21 and 22 illustrate the drive as applied to a member 262 having a plurality of perforations 263. The drive rolls 264 are provided with pins 265 which are adapted to alternately engage the perforations 263 for driving the blade 262 with an oscillating movement. The rolls 266 have surfaces adapted to engage the blade 262 and hold the same in position to receive the pins 265.

A positive feed may be obtained by providing an extra pin 265 on one of the rolls 264 and a blank space corresponding thereto on the other roll 264 so that a greater movement is effected in one direction than in the other.

A further modified type of feed is illustrated in Figure 23 in which the drive rolls 270 are provided with driving segments 271 and with a friction material 272 disposed between said driving segments. In this form of the device, the friction material of one set of rolls engages the blade 273 while the blade is being driven by the driving segments associated with the other set of rolls. The friction material thus exerts a drag on the blade to hold the same at all times under positive tension. This type of drive may be desirable in certain instances as, for example, with extremely flexible blades.

Figure 24 illustrates the adaptation of the present invention to a gang saw. In this form of the invention, a blade 275 is fed by sets of feed rolls 276 and 277, similar to those above described, and is passed around idler pulleys 278 in a plurality of parallel folds. Inasmuch as the entire blade is reciprocated by the drive rolls, it is obvious that a member which is passed across all of the folds will be simultaneously operated upon by a plurality of cutting edges and will be cut at the positions occupied by the various folds. It is obvious that the folds may be irregularly disposed and that they may be guided in any convenient manner so as to cut along irregular paths.

The blade 275 may be held under tension in both directions, as described above, so as to obtain the desired characteristics, particularly when a thin, flexible blade, such as a wire, is used.

Figure 25 illustrates the drive as applied to a rotating member such, for example, as a washing machine having a rotating shaft 280 carrying a drum 281 which engages sets of drive rolls 282 which are variously disposed about the periphery of said drum and are adapted to engage the same to alternately drive it in opposite directions in the manner outlined above. It is assumed by way of example that diametrically opposite rolls are arranged to feed the drum simultaneously in one direction, whereas the opposite set of diametrically opposite rolls are adapted to feed the drum in the opposite direction.

The term "reciprocating" is used herein to designate to and fro movement, either linear or rotary, and is to be interpreted accordingly.

Although only a few of the various forms and adaptations of the present invention have been outlined above, it is obvious that various changes and modifications may be made therein and that the invention may be applied to various uses as will be readily apparent to a person skilled in the art. The invention is only to be limited in accordance with the following claims when interpreted in view of the prior art.

I claim:

1. A mechanical drive for producing combined reciprocating and progressive movement comprising a driven member, drive means engaging the same to produce reciprocating movement thereof, and means associated with said drive means to cause said driven member to progressively feed at each reciprocation.

2. A mechanical drive comprising a driven member and drive means therefor comprising sets of drive rolls, the rolls of the different sets rotating to drive said member in opposite directions, said rolls having driving segments arranged to intermittently engage said member for driving the same, the driving segments of the different sets of rolls being arranged to alternately engage said member, whereby said member is alternately driven in opposite directions.

3. A mechanical drive comprising a driven member and drive means therefor comprising a pair of sets of drive rolls, the drive rolls of each set being adapted to intermittently and alternately drive said member, the rolls of the two sets rotating in opposite directions, whereby said member is caused to reciprocate.

4. In combination, a driven member and drive means therefor comprising a plurality of drive rolls, each roll having means to intermittently engage and drive said member, said rolls being arranged to alternately drive said member in opposite directions whereby a reciprocating movement is imparted thereto.

5. In combination, a driven member and drive means therefor comprising two or more drive rolls rotating to drive said member in opposite directions, said rolls having means to intermittently and alternately engage said member, one of said rolls being released from said member while the other of said rolls is in driving engagement therewith.

6. In combination, a driven member and drive means therefor comprising two or more drive rolls rotating to drive said member in opposite directions, said rolls having driving segments adapted to intermittently and alternately engage said member, the driving segment of one of said rolls being released from said member, while the driving segment of the other of said rolls is in driving engagement therewith, and means to adjust at least one of said rolls toward or away from said member to thereby vary the effective arc of engagement of said driving segment with said member whereby the relative rate of feed of said member may be controlled.

7. In combination with a driven member, drive means adapted to engage said member to impart a reciprocating movement thereto, and means associated with said drive means to cause said member to move in opposite directions by different amounts whereby a progressive feed is obtained.

8. In combination with a driven member, drive means adapted to intermittently drive said member a given amount in one direction, and a second driving means adapted to alternately and intermittently drive said member a different amount in the opposite direction whereby a combined reciprocating and progressive movement is imparted thereto.

9. A cutting machine or the like comprising a cutting blade, drive rolls engaging said blade to cause reciprocating movement thereof, and means associated with said drive rolls to cause said blade to progressively feed at each reciprocation.

10. A cutting machine or the like comprising a cutting blade and a pair of drive rolls rotating in opposite directions, said rolls being adapted to alternately engage and drive said blade with a reciprocating movement.

11. A cutting machine or the like comprising a cutting blade, a pair of drive rolls engaging said blade, said rolls having driving segments adapted to alternately engage and feed said blade in opposite directions.

12. A cutting machine or the like comprising a cutting blade, a pair of drive rolls engaging said blade, said rolls having driving segments adapted to alternately engage and drive said blade in opposite directions, and means for adjusting at least one of said rolls toward or away from said blade to thereby vary the effective arc of contact of its driving segment whereby the rate of feed of said blade may be controlled.

13. In a cutting machine or the like, a pair of reels, a cutting blade carried on one of said reels, means to feed said blade from one reel to the other at a uniform rate, and means to produce reciprocating movement of a portion of the blade being fed.

14. A cutting machine having a plurality of feed chambers, a cutting blade, means to feed said blade from a source of supply through said feed chambers and past a cutting station, and means to reciprocate the portion of said blade at said cutting station, said feed chambers being adapted to prevent the irregular feeding movement from being transmitted to said source of supply.

15. In a cutting machine or the like, a cutting blade, a reel carrying said blade, means to feed said blade from said reel past a cutting station, means to reciprocate the portion of said blade at said cutting station, and a feed chamber between said source of supply and said cutting station and adapted to prevent irregular feed of the blade from being transmitted to said source of supply.

16. In a cutting machine or the like, a band cutting member, feeding means therefor, and means to feed material to be cut into cutting position comprising a pivoted member adapted to carry said material, said member being adapted to feed said material to said band cutting member along a path comprising an arc which is substantially parallel to said band cutting member at the end of the cutting operation.

17. In a cutting machine or the like, a band cutter, feeding means therefor, and a pivoted turret adapted to carry material to be cut, said turret having means to feed said material to said band cutter along an arc which extends transversely of said cutter and becomes substantially parallel thereto at the end of the cutting operation.

18. In a cutting machine or the like, a band cutter, means to feed the same, a material support adapted to feed material to be cut during the cutting operation, and means associated with said support for feeding said material first in a direction transverse to said band cutter and as the cutting progresses to feed said material in a path approaching the parallel to the line of movement of said cutter, whereby the cutting teeth are prevented from deforming the edge of said material at the end of the cutting operation.

19. A machine for cutting elongated material comprising a band cutter, a support for said material comprising a turret having a tube adapted to receive said material, said turret being pivoted to cause said tube to approach the cutting position in an arc terminating substantially parallel to the line of movement of the cutting edge.

20. A machine for cutting elongated material comprising a band cutter, a support for said material comprising a turret having a tube adapted to receive said material, said turret being pivoted to cause said tube to approach the cutting position in an arc terminating substantially parallel to the line of movement of the cutting edge, means associated with said tube to hold said material in a fixed position during the cutting operation, said last means being releasable at the end of the cutting operation to permit said material to be fed longitudinally of said tube prior to the next cutting operation.

21. A machine for cutting sections from an elongated member comprising a band cutter, feed means associated therewith, and a turret having a plurality of tubes adapted to independently receive said elongated member, means to selectively move one of said tubes into cutting position along an arc terminating substantially parallel to the line of movement of the cutting edge, and means to longitudinally feed the elongated member in said tube between successive cutting operations.

22. A machine for cutting transverse sections from material in the form of tubes, rods, or the like, comprising a band cutter, feed means therefor and a turret having a tube adapted to receive said material and to feed said material to said band cutter at each cutting operation, means associated with said tube to hold said material during the cutting operation, and means to release holding means when said tube is retracted from cutting position whereby said material is fed longitudinally of said tube prior to the next cutting operation.

23. In a cutting machine, a cutting member, means to cause said member to reciprocate and to feed in a given direction, a stop adapted to engage the end of said member to limit the movement thereof at each reciprocation, said feed means being adapted to feed said member progressively until the end thereof engages said stop and to thereafter cause said member to reciprocate in the same position until said stop is removed.

24. In a cutting machine, a cutting blade, means to reversibly feed said blade, and means to engage the end of said blade at the end of its path of travel to automatically reverse the direction of feed thereof.

25. In a cutting machine, a cutting blade, means to impart combined reciprocating and progressive movement thereto, a contact member adapted to control the operation of said machine, and means associated with said blade to maintain said contact in closed position until the blade reaches the end of its path of travel.

26. In a cutting machine, a flexible cutting member, means to feed said member uniformly to or from a source of supply, supporting rolls adapted to guide said blade in cutting position, and eccentric means to cause said rolls to reciprocate, whereby combined reciprocating and progressive movement is imparted to said cutting member.

27. In a cutting machine, a blade, a pair of feed rolls engaging said blade, said rolls being mounted on a pivoted arm, means to reciprocate said arm whereby reciprocating movement is imparted to said blade, and ratchet means brought into operation at each reciprocation to progressively feed said blade in one direction.

28. In a cutting machine, a cutting blade, a pair of rolls engaging said blade, a bracket carrying said rolls, means to cause said bracket to reciprocate to impart longitudinal reciprocating movement to said blade, a gear wheel carried by said bracket and adapted to rotate said rolls for feeding said blade, and means associated with said gear wheel to permit the same to be selectively rotated.

29. A feed mechanism comprising a pair of sets of drive rolls, a driven member engaged by the rolls of each set, said rolls having irregular driving segments adapted to intermittently engage said member, the driving segments of one of said sets being adapted to release said member while the driving segments of the other sets are engaged thereby, and means rotating the rolls of said sets of drive said member in opposite directions to thereby impart an irregular reciprocating movement to said member.

30. A feed mechanism comprising a driven member, a pair of drive rolls engaging the same and rotating to drive the member in opposite directions, said rolls being of different diameters and each having driving surfaces adapted to intermittently drive said member whereby combined reciprocating and progressive movement is imparted thereto.

31. A feed mechanism for a perforated member comprising a plurality of rotating drive rolls having pins adapted to intermittently engage the perforations of said member, said rolls rotating to drive said member in opposite directions.

32. A feed mechanism comprising a roll having driving segments, a driven member engaging said roll, said roll having means to engage said member between the driving segments and to exert a drag thereon for holding the member under tension.

33. A cutting machine having a flexible cutting blade arranged in reverse folds and drive means for said cutting blade comprising rolls arranged on opposite sides of said folds and adapted to impart a reciprocating movement to said blade.

34. In combination, a rotatable member, a drum carried thereby and a plurality of drive rolls adapted to alternately engage said drum to drive the same with a reciprocating movement.

35. The method of feeding material to a cutting edge which comprises feeding said material first in a direction transverse to said edge and gradually changing the direction of feed as the cutting progresses to cause said direction to extend substantially parallel to said edge at the end of the cutting operation whereby the cutting edge is prevented from causing a ragged edge at the point where it emerges from said material.

36. In a drive mechanism comprising a rotating member having driving segments adapted to intermittently engage a driven member, the method of varying the extent of travel of the driven member which comprises adjusting the rotating member toward or away from the driven member to thereby vary the time of engagement and release of the driving segments.

37. A mechanical drive for producing combined reciprocating and progressive movement comprising a driven member, drive means engaging the same to produce linear reciprocating movement thereof, and means associated with said drive means to cause said driven member to progressively feed longitudinally in one direction.

38. A mechanical drive comprising a driven member and drive means therefor comprising sets of drive rolls, the rolls of the different sets rotating to drive said member in opposite directions, said rolls having raised driving segments arranged to intermittently engage said member for driving the same, the driving segments of the different sets of rolls being arranged to alternately engage said member, whereby said member is alternately driven in opposite directions.

39. A mechanical drive comprising a driven member and drive means therefor comprising sets of drive rolls, the rolls of the different sets rotating to drive said member in opposite directions, said rolls having driving segments arranged to intermittently engage said member for driving the same, the driving segments of the different sets of rolls being arranged to alternately engage said member and being adapted to drive said member by different amounts, whereby a combined reciprocating and progressive movement is imparted thereto.

40. In combination, a driven member and drive means therefor comprising a plurality of drive rolls, each roll having means to intermittently engage and drive said member, said rolls being arranged to alternately drive said member in opposite directions by different amounts, whereby a combined reciprocating and progressive movement is imparted thereto.

41. In combination, a driven member and drive means therefor comprising two or more drive rolls rotating to drive said member in opposite directions, said rolls having raised driving segments adapted to intermittently and alternately engage said member, the driving segment of one of said rolls being released from said member, while the driving segment of the other of said rolls is in driving engagement therewith, and means to adjust at least one of said rolls toward or away from said member to thereby vary the effective arc of engagement of said driving segments with said member whereby the relative rate of feed of said member may be controlled.

42. In a cutting machine or the like, a flexible cutting member, spaced driving means located on opposite sides of the cutting position and adapted to alternately pull said member past said cutting position, whereby a reciprocating movement is imparted thereto.

43. In a cutting machine or the like, a flexible cutting member, spaced driving means located on opposite sides of the cutting position and adapted to alternately pull said member past said cutting position and to progressively feed said member, whereby a combined reciprocating and progressive movement is imparted thereto.

44. In a cutting machine or the like, a flexible cutting member, spaced driving means located on opposite sides of the cutting position and adapted to alternately pull said member past said cutting position, whereby a reciprocating movement is imparted thereto, and means to maintain the portion of said member at said cutting position under tension.

45. In a cutting machine or the like, an endless flexible cutting member, means to impart a combined reciprocating and progressive movement thereto, and means holding under tension only the portion of said member at cutting position.

46. In a cutting machine, in combination, a flexible blade of substantial length and driving means adapted to impart a combined reciprocating and progressive movement thereto for continuously renewing the cutting edge.

47. In a cutting machine, in combination, a loose endless cutting blade and driving means adapted to impart a combined reciprocating and progressive movement thereto.

48. A cutting machine or the like comprising a cutting blade, a pair of drive rolls engaging said blade, said rolls having raised driving segments adapted to alternately engage and drive said blade in opposite directions, and means for adjusting at least one of said rolls toward or away from said blade to thereby vary the effective arc of contact of its driving segment whereby the rate of feed of said blade may be controlled.

49. A machine for cutting transverse sections from material in the form of tubes, rods, or the like, comprising a band cutter, feed means therefor and a turret having a tube adapted to receive said material and to feed said material to said band cutter at each cutting operation, means associated with said tube to hold said material during the cutting operation, means to release holding means when said tube is retracted from cutting position whereby said material is fed longitudinally of said tube prior to the next cutting operation, and a table below said turret adapted to limit the movement of said material so as to determine the size of the cut portions.

50. A cutting machine comprising a band cutter, feed means therefor, and a turret adapted to feed material into cutting position, said turret having a pair of guide members closely adjacent said band cutter for guiding said cutter during the cutting operation.

51. In a cutting machine, a cutting blade, means to impart combined reciprocating and progressive movement thereto in one direction, and means to reverse the progressive movement.

52. In a cutting machine, a cutting blade, means to impart combined reciprocating and progressive movement thereto in one direction, and means to reverse the progressive movement at the end of the path of travel of the blade.

53. In a cutting machine, a cutting blade, means to impart combined reciprocating and progressive movement thereto in one direction and means to engage the end of the blade to reverse the progressive movement thereof at each end of its normal path of travel.

54. In a cutting machine, a blade, a pair of feed rolls engaging said blade, said rolls being mounted on a pivoted arm, means to reciprocate said arm whereby reciprocating movement is imparted to said blade, and means to feed said blade in one direction for renewing the cutting edge thereof.

55. A feed mechanism for a perforated member comprising a plurality of rotating drive rolls having pins adapted to intermittently engage the perforations of said member, said rolls rotating to drive said member in opposite directions, one of said rolls having an extra pin so as to drive said member a greater amount than the other roll so as to effect a progressive feed.

56. A mechanical drive comprising a driven member and drive means therefor comprising sets of drive rolls, the rolls of the different sets rotating to drive said member in opposite directions, said rolls having driving segments arranged to intermittently engage said member for driving the same, the driving segments of the different sets of rolls being arranged to alternately engage said member, whereby said member is alternately driven in opposite directions, and friction means between said driving segments adapted to hold the member under tension while it is being driven.

57. A mechanical drive comprising a driven member and drive means therefor comprising sets of drive rolls, the rolls of the different sets rotating to drive said member in opposite directions, said rolls having driving segments arranged to intermittently engage said member for driving the same, the driving segments of the different sets of rolls being arranged to alternately engage said member, and friction means between said driving segments, the friction means on one set of rolls being adapted to exert a drag on said member while it is being driven by the other rolls, whereby the member is maintained under tension during the driving thereof.

58. In combination, a rotatable member, a drum carried thereby and a plurality of drive rolls having driving segments adapted to alternately engage said drum to drive the same with a reciprocating movement.

59. In combination, a rotatable member, and means to impart a reciprocating movement thereto comprising a pair of oppositely rotating drive members having driving segments adapted to alternately drive said rotatable member in opposite directions.

60. The method of feeding material to a cutting edge which comprises feeding said material to said edge along a path represented by the arc of a circle tangent to the cutting edge at the completion of the cutting operation.

61. In combination, a rotatable member, means to impart a reciprocating movement thereto comprising a pair of oppositely rotating drive members having driving segments adapted to alternately drive said rotatable member in opposite directions, and means for progressively feeding said rotatable member in one direction to cause combined reciprocating and rotational movement thereof.

62. In combination, a rotatable member, and means to impart a reciprocating movement thereto comprising a pair of oppositely rotating drive members having driving segments adapted to alternately drive said rotatable member in opposite directions, one of said driving segments being adapted to cause greater rotational movement than the other, whereby progressive rotational movement is combined with reciprocating movement.

LEONARD B. TERHUNE.

CERTIFICATE OF CORRECTION.

Patent No. 2,081,962.　　　　　　　　　　　　　　　　　　June 1, 1937.

LEONARD B. TERHUNE.

It is hereby certified that error appears in the printed specification of the above numbered patent requiring correction as follows: Page 1, first column, line 30, for "O" before "further" read A; page 3, first column, line 16, for "engagment" read engagement; page 8, first column, line 29, claim 29, for "of" read to; line 36, claim 30, for "surfaces read segments; and that the said Letters Patent should be read with these corrections therein that the same may conform to the record of the case in the Patent Office.

Signed and sealed this 27th day of July, A. D. 1937.

(Seal)　　　　　　　　　　　　　　　　　　　　　　Henry Van Arsdale
　　　　　　　　　　　　　　　　　　　　　　Acting Commissioner of Patents.